(12) United States Patent
Prabhakara et al.

(10) Patent No.: US 12,358,329 B2
(45) Date of Patent: Jul. 15, 2025

(54) TIRE SENSING SYSTEMS AND METHODS

(71) Applicants: Bridgestone Americas Tire Operations, LLC, Nashville, TN (US); Carnegie Mellon University, Pittsburgh, PA (US)

(72) Inventors: Akarsh Prabhakara, Pittsburgh, PA (US); Vaibhav Singh, Pittsburgh, PA (US); Swarun Kumar, Pittsburgh, PA (US); Anthony Rowe, Pittsburgh, PA (US); Terence E. Wei, Copley, OH (US); Hans R. Dorfi, Akron, OH (US)

(73) Assignees: Bridgestone Americas Tire Operations, LLC, Nashville, TN (US); Carnegie Mellon University, Pittsburgh, PA (US)

(*) Notice: Subject to any disclaimer, the term of this patent is extended or adjusted under 35 U.S.C. 154(b) by 401 days.

(21) Appl. No.: 17/924,647

(22) PCT Filed: May 11, 2021

(86) PCT No.: PCT/US2021/031712
§ 371 (c)(1),
(2) Date: Nov. 10, 2022

(87) PCT Pub. No.: WO2021/231381
PCT Pub. Date: Nov. 18, 2021

(65) Prior Publication Data
US 2023/0182509 A1   Jun. 15, 2023

Related U.S. Application Data

(60) Provisional application No. 63/035,483, filed on Jun. 5, 2020, provisional application No. 63/022,933, filed on May 11, 2020.

(51) Int. Cl.
*B60C 19/00* (2006.01)
*B60C 11/24* (2006.01)

(52) U.S. Cl.
CPC ............ *B60C 19/00* (2013.01); *B60C 11/243* (2013.01); *B60C 2019/004* (2013.01)

(58) Field of Classification Search
CPC . B60C 19/00; B60C 11/243; B60C 2019/004; B60C 2011/0346; B60C 11/04; B60C 11/246; G06V 20/64; G01B 15/04
See application file for complete search history.

(56) References Cited

U.S. PATENT DOCUMENTS

| 7,797,995 B2 | 9/2010 | Schafer |
| 8,621,919 B2 | 1/2014 | Pingel |

(Continued)

FOREIGN PATENT DOCUMENTS

| JP | 2009516838 A | 4/2009 |
| JP | 2012523547 A | 10/2012 |

(Continued)

OTHER PUBLICATIONS

International Search Report and Written Opinion dated Aug. 6, 2021 issued by EPO in connection with corresponding International Application No. PCT/US2021/031712.

(Continued)

*Primary Examiner* — Fernando Alcon

(57) ABSTRACT

Tire sensing systems operable to determine one or more physical characteristics of a tire include millimeter wave transmitting and receiving devices. A processor is communicatively coupled with a memory that includes instructions to transmit and receive a millimeter wave toward and from the tire. Memory also includes instructions to image first and second radial extents of the tire based on the received millimeter wave as well as instructions to determine a (Continued)

dimensional difference between the first and second radial extents of the tire. Vehicles including such tire sensing systems as well as non-transitory machine-readable storage mediums and methods are also included.

20 Claims, 11 Drawing Sheets

(56) References Cited

U.S. PATENT DOCUMENTS

| | | | |
|---|---|---|---|
| 10,078,892 B1* | 9/2018 | Wang | B60C 11/246 |
| 10,311,835 B1 | 6/2019 | Dorrance | |
| 10,399,393 B1* | 9/2019 | Trotta | B60C 23/0452 |
| 10,675,925 B1* | 6/2020 | Oakes, III | B60C 23/0486 |
| 11,396,152 B1* | 7/2022 | Roy | B29C 64/20 |
| 2008/0256815 A1 | 10/2008 | Schafer | |
| 2014/0217808 A1* | 8/2014 | Chang | B60C 7/101 |
| | | | 301/63.101 |
| 2016/0031272 A1* | 2/2016 | Peine | B60C 11/243 |
| | | | 340/442 |
| 2017/0361662 A1* | 12/2017 | Wei | B60C 11/24 |
| 2019/0381835 A1* | 12/2019 | Grandemange | B60C 11/0304 |
| 2020/0031173 A1* | 1/2020 | Scheckter | G01M 17/027 |
| 2020/0098121 A1* | 3/2020 | Tenkasi Shankar | G06T 7/0004 |
| 2020/0278196 A1* | 9/2020 | Santanera | G01B 11/25 |
| 2022/0099531 A1* | 3/2022 | Fanton | B60C 25/007 |
| 2022/0258548 A1* | 8/2022 | Nordmeyer | G01S 13/06 |
| 2022/0324266 A1* | 10/2022 | Alghooneh | B60C 11/246 |
| 2023/0077244 A1* | 3/2023 | Maekawa | G06T 11/00 |
| 2024/0192359 A1* | 6/2024 | Boehlefeld | G01S 7/41 |

FOREIGN PATENT DOCUMENTS

| | | |
|---|---|---|
| JP | 2015196403 A | 11/2015 |
| WO | WO-2019024170 A1 | 2/2019 |

OTHER PUBLICATIONS

Japanese-language Office Action issued on Oct. 27, 2023 by the Japanese Patent Office in connection with corresponding Japanese Patent Application No. JP 2022-568949 as well as English-language machine translation of the Office Action.

* cited by examiner

TIRE SENSING SYSTEMS AND METHODS

This application is the National Stage of International Application No. PCT/US2021/031712, filed on May 11, 2021, which claims the benefit of priority from U.S. Provisional Patent Application No. 63/022,933, filed on May 11, 2020 and U.S. Provisional Patent Application No. 63/035,483, filed on Jun. 5, 2020, the entire contents of each of which is hereby incorporated herein by reference.

GOVERNMENT LICENSE RIGHTS

This invention was made with government support under Contract Nos. 1823235 and 1942902 awarded by the National Science Foundation (NSF). The U.S. government may have certain rights in the invention.

BACKGROUND

The subject matter of the present disclosure broadly relates to the art of tire sensing systems for vehicles and, more particularly, to systems operable to determine instantaneous tire tread depth and/or monitor tire wear over an extended duration. Additionally, or in the alternative, systems operable to identify foreign objects lodged on or within a tire are also included. Further still, and/or as another alternative, methods of determining instantaneous tire tread depth, monitoring tire wear, and/or identifying foreign objects are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary.

The most common approach to monitoring tire condition involves a somewhat tedious approach of visually inspecting tires and physically measuring tread depth. Though such an approach is essentially free from cost, it is commonly believed that this manual procedure is performed with insufficient frequency and attention by vehicle owners and operators. As such, tire tread depth and tire wear patterns are thought to be under-monitored on commercial and passenger vehicles. Tire tread wear affects performance and is an important metric for deciding tire replacement, which is recognized as one of the biggest maintenance expenses of the global trucking industry. Small errors in assessing tread depth and/or tire wear when performing the manual inspection process can result in replacing a tire prior to the end of its service life or inadvertently allowing a tire to remain in use beyond its service life. Either of such conditions can lead to increased costs for commercial trucking operations due to premature replacement of tires or increased breakdowns and roadway service calls. Similar issues are applicable to tires on passenger vehicles due to such manual evaluations being performed by vehicle owners.

In some cases, electronic systems have been developed that utilize various wireless sensing techniques to monitor physical characteristics of tires. In some cases, components of the systems are supported external to the tire, such as on or along a body, frame or chassis of a vehicle, for example. Unfortunately, known systems that utilize off-wheel mounting arrangements are subject to certain disadvantages that may have limited the broader adoption and/or use of these types of arrangements. For example, certain systems that are known to utilize laser-based distance sensors to estimate the amount of tread remaining on a tire can experience errors due to the accumulation of debris and other foreign material on the tire and/or within the tire tread.

In other cases, systems have been developed that utilize tire pressure and/or sensors mounted within a tire chamber to estimate tire tread depth. However, due at least in part to the indirect nature of such measurements and/or the amount of tire material between the measured conditions and the tire tread, such tread depth estimates can vary widely from actual tread conditions and are sometimes deemed to be somewhat unreliable. In still other cases, systems have been developed that utilize sensors and/or devices embedded within the tread and/or body of the tire. Such sensors and/or devices are exposed to the extreme conditions associated with tire usage on over-the-road vehicles, which can include temperatures ranging from around −35° C. to around 85° C. as well as high pressures and constantly changing load conditions during dynamic use of the tire. In that such sensors and/or devices should remain functional for the life of the tire, embedded sensors and/or devices can increase the cost of manufacturing tires due at least in part to the cost of robust sensor components as well as the added steps associated with embedding the sensors and/or devices in the tire during assembly. As a further disadvantage, such embedded sensors and/or devices are then discarded once the tire has reached the end of its useful life.

In view of the foregoing, it is believed that a need exists to evaluate tread depth and/or other characteristics of vehicle tires from time-to-time and/or on an ongoing basis, such as to monitor certain conditions of wear and/or possible changes in performance characteristics of such tires. Notwithstanding the overall success of known measurement and/or monitoring techniques, it is believed desirable to develop systems and methods that may improve over known options and/or otherwise advance the art of tire sensing systems.

BRIEF DESCRIPTION

One example of a tire sensing system in accordance with the subject matter of the present disclosure is operable to determine one or more physical characteristics of an associated tire. The tire sensing system can include a millimeter wave transmitting device and a millimeter wave receiving device. The tire sensing system can also include a processor communicatively coupled with a memory. The memory can include instructions to transmit a millimeter wave toward the associated tire using the millimeter wave transmitting device. The memory can also include instructions to receive a millimeter wave reflected from the associated tire at the millimeter wave receiving device. The memory can further include instructions to image first and second radial extents of the associated tire based on the received millimeter wave. And, the memory can include instructions to determine a dimensional difference between the first and second radial extents of the associated tire.

One example of a vehicle in accordance with the subject matter of the present disclosure can include a tire with a tread groove and a tire sensing system according to the foregoing paragraph operatively associated with the tire. In some cases, the tire can, optionally, include a plurality of differentially-reflective structures disposed on or along the tire. In some cases, the plurality of differentially-reflective structures can be disposed in a circumferential sequence on or along the tire. In some cases, the plurality of differentially-reflective structures can be disposed within the tread groove of the tire.

One example of a non-transitory machine-readable storage medium in accordance with the subject matter of the present disclosure can have stored thereon machine-readable instructions to cause a processor to transmit a millimeter wave toward an associated tire using a millimeter wave transmitting device. The storage medium can also include instructions to cause a processor to receive a millimeter wave reflected from the associated tire at a millimeter wave receiving device. The storage medium can further include instructions to cause a processor to image first and second radial extents of the associated tire based on the received millimeter wave. And, the storage medium can include instructions to cause a processor to determine a dimensional difference between the first and second radial extents of the associated tire.

One example of a method in accordance with the subject matter of the present disclosure of sensing a physical characteristic of an associated tire can include transmitting a millimeter wave toward the associated tire. The method can also include receiving a millimeter wave reflected from the associated tire. The method can further include imaging first and second radial extents of the associated tire using the reflected millimeter wave, and determining a dimensional difference between the first and second radial extents of the associated tire.

DETAILED DESCRIPTION

As used herein, terms such as "data", "values", "information", "signals" and the like are used interchangeably herein to broadly refer to analog and/or digital content and/or communications, such as may be transmitted, transferred, stored, retrieved, processed and/or exchanged by and/or between components and/or systems in any suitable manner.

It is to be recognized and appreciated that terms such as "can", "may", "might" and the like are to be interpreted as being permissive rather than required. As such, any reference to items with which terms such as "can", "may", "might" and the like are used shall be interpreted as being optional rather than required by the subject matter of the present disclosure unless otherwise specifically set forth herein.

Turning now to the drawings, it is to be understood that the showings are for purposes of illustrating examples of the subject matter of the present disclosure and that such examples are not intended to be limiting. Additionally, it will be appreciated that the drawings are not to scale and that portions of certain features and/or elements may be exaggerated for purposes of clarity and/or ease of understanding.

Figure 1:
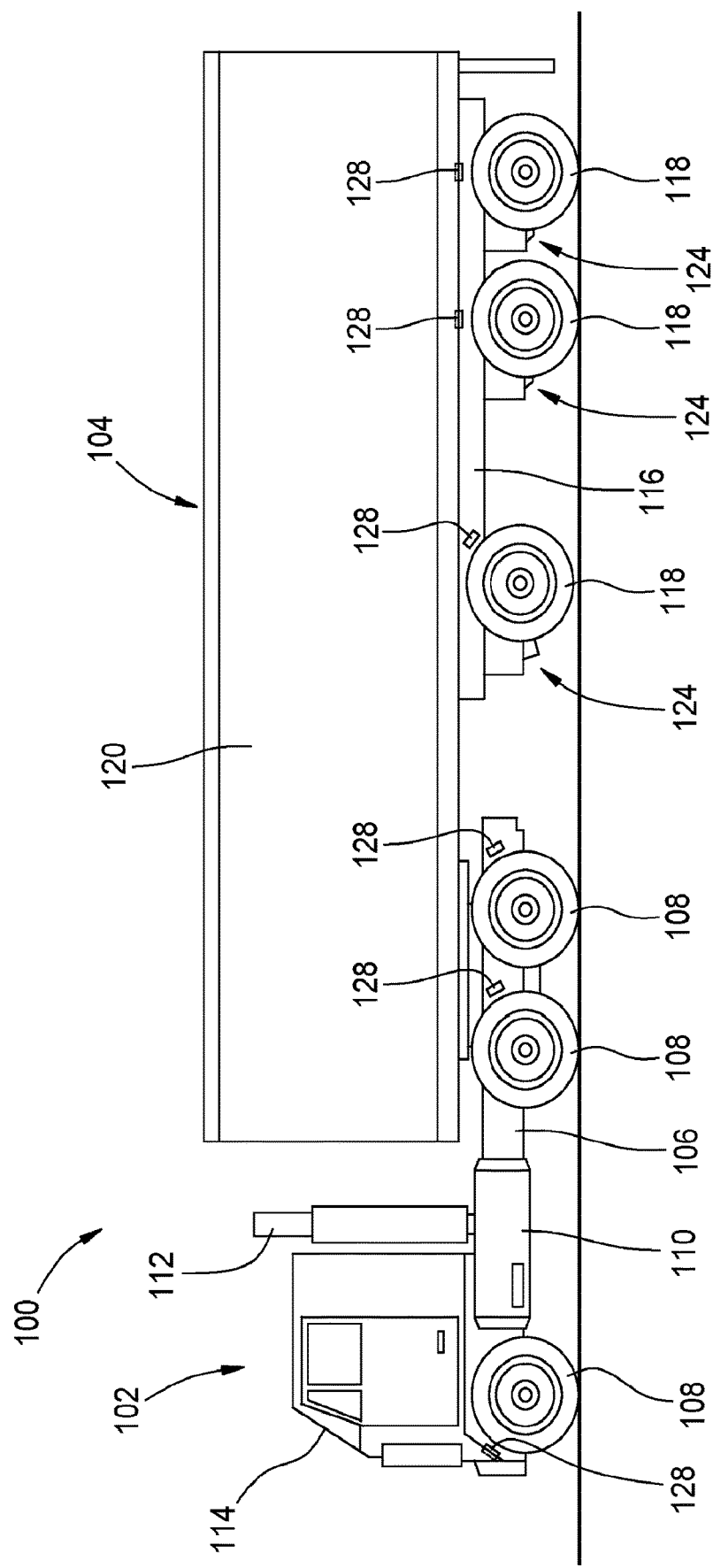
FIG. 1 is a side elevation view of one example of a vehicle that includes a tire sensing system in accordance with the subject matter of the present disclosure.

It will be appreciated that tire sensing systems in accordance with the subject matter of the present disclosure can be used with wheeled vehicles of any type, kind and/or configuration. As non-limiting examples, such wheeled vehicles can include passenger vehicles, motor homes, busses, light-duty trucks and other vehicles (e.g., U.S. FHWA Class 1-3 vehicles), medium-duty trucks and other vehicles (e.g., U.S. FHWA Class 4-6 vehicles), heavy-duty trucks and other vehicles (e.g., U.S. FHWA Class 7 and 8 vehicles), trailers, agricultural equipment and off-road vehicles. One non-limiting representation of vehicles on which tire sensing systems in accordance with the subject matter of the present disclosure can be installed is shown and described in connection with FIGS. 1 and 2. As illustrated therein, a vehicle 100 is shown as taking the form of a tractor-trailer combination that includes a tractor 102 and a trailer 104 that is operatively connected to the tractor for over-the-road transport. Tractor 102 is shown as including a frame 106 that is supported on a plurality of wheel assemblies 108 by a suspension system. Tractor 102 will typically also include a motor or rotational power source (not shown) and drivetrain (not shown) that are supported on the frame and provide motive power to one or more of wheel assemblies 108. Tractor 102 can include a power storage device 110 (e.g., a fuel tank and/or battery) and can, optionally, include an exhaust stack 112 that are operatively associated with the motor. Tractor 102 can also include an operator compartment or cab 114 that can be supported on or along frame 106 in any suitable manner, such as by way of one or more cab mounts and/or one or more cab suspensions, for example.

Trailer 104 is shown as including a frame 116 that is supported on a plurality of wheel assemblies 118 by a suspension system. Trailer 104 can also include a trailer body 120 that is at least partially supported on frame 116 and is generally dimensioned to receive and retain a quantity of cargo. As referenced above, vehicle 100 can include one or more suspension systems operatively connected between a sprung mass, such as frame 106, operator compartment 114, frame 116 and/or trailer body 120, for example, and an unsprung mass, such as wheel assemblies 108, wheel assemblies 118 and/or wheel-engaging components 122 (e.g., axles, suspension arms), for example, of the vehicle. In the exemplary arrangement shown in FIGS. 1 and 2, such suspension systems are schematically represented by reference characters 124, and can include spring devices (e.g., coil springs, leaf springs, air springs) and/or one or more dampers that together with the spring devices permit movement of the sprung and unsprung masses relative to one another in a somewhat controlled manner.

Vehicle 100 also includes a tire sensing system 126 in accordance with the subject matter of the present disclosure that is operatively associated with one or more wheel assemblies of the vehicle (e.g., one or more of wheel assemblies 108 and/or 118). Tire sensing system 126 can include one or more sensing devices 128 disposed proximate to a corresponding one of the wheel assemblies of the vehicle. In the exemplary arrangement shown in FIGS. 1 and 2, tire sensing system 126 can include a plurality of sensing devices 128 with one sensing device supported on the vehicle adjacent a corresponding one of wheel assemblies 108 and/or 118. It will be appreciated, however, that such an arrangement is merely exemplary and that other configurations can be used without departing from the subject matter of the present disclosure.

Tire sensing system 126 can also include a control system 130 to which sensing devices 128 can be communicatively coupled. Control system 130 can also, optionally, be communicatively coupled with other systems and/or components of vehicle 100, such as to exchange data, information and/or signals and/or for selective operation and/or control of such other systems, for example. Control system 130 can include a controller or electronic control unit (ECU) 132 communicatively coupled with sensing devices 128, such as through electrical conductors or leads 134, for example. It will be appreciated that controller 132 can be of any suitable type, kind and/or configuration, such as is described hereinafter, for example.

Figure 2:
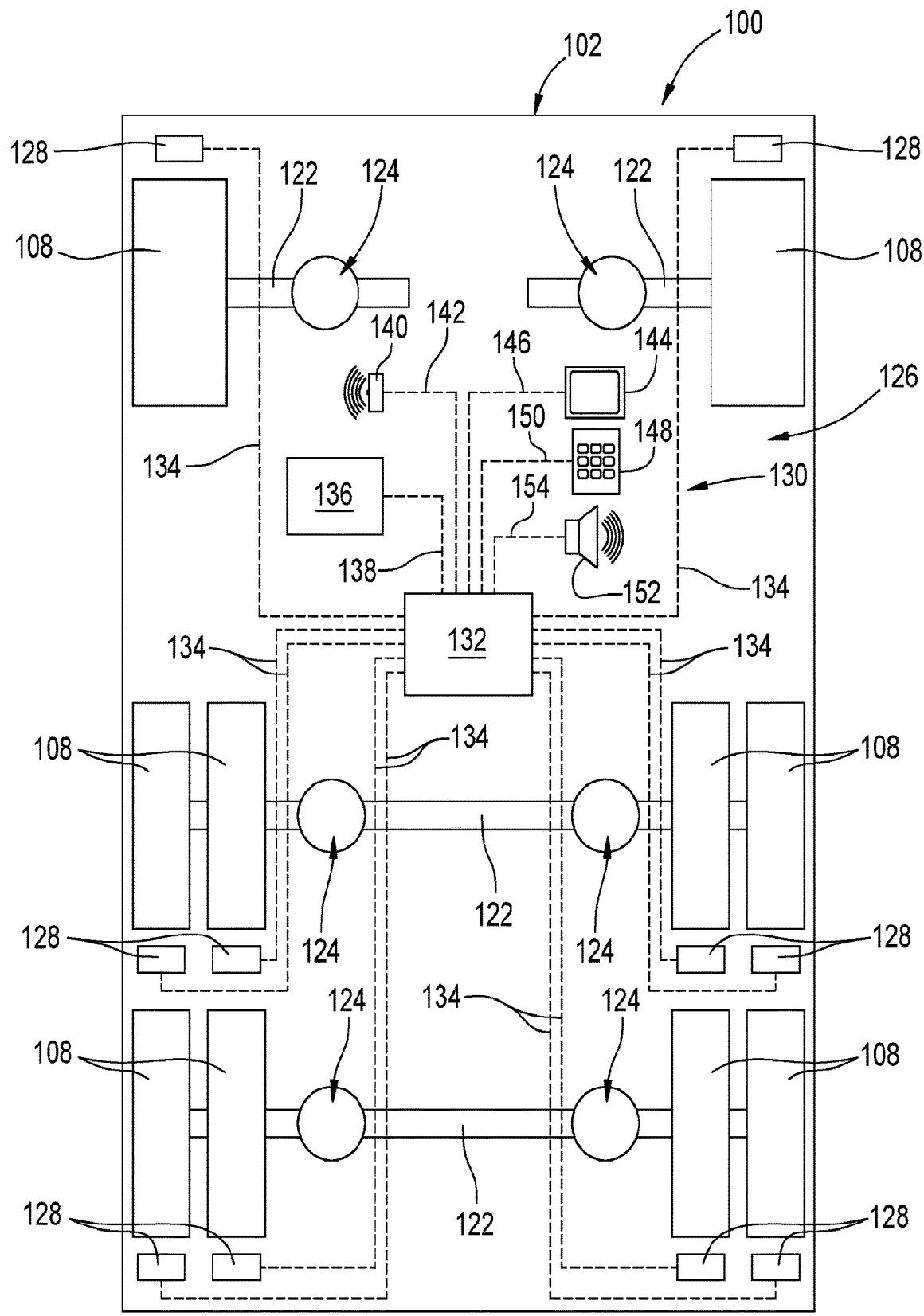
FIG. 2 is a schematic representation of the tire sensing system in FIG. 1 installed on the associated vehicle.

As indicated above, control system 130 can, optionally, be communicatively coupled with one or more other systems and/or devices of vehicle 100. As non-limiting examples, vehicle 100 is shown in FIG. 2 with controller 132 communicatively coupled with one or more associated systems, modules and/or devices, which are collectively represented by box 136 and communicatively coupled with controller 132 by way of electrical conductors or leads 138. Additionally, or in the alternative, control system 130 can, optionally, include one or more communication interface systems and/or devices 140, such as may be suitable for sending and/or receiving data, information and/or signals to and/or from remote systems and/or devices, such as remote data storage devices and/or remote computer systems (e.g., fleet management systems), for example. If included, any such one or more communication interface systems and/or devices 140 can be communicatively coupled with controller 132 in any suitable manner, such as by way of electrical conductors or leads 142, for example.

Furthermore, or as a further alternative, control system 130 can, optionally, include and/or otherwise interface with a visual communication device 144 that is communicatively coupled with controller 132 in a suitable manner, such as by way of electrical conductors or leads 146, for example. In some cases, visual communication device 144 can take the form of a graphical input/output device, such as a capacitive or resistive touch screen, for example. In which case, additional user input devices can, optionally, be omitted. In other cases, visual communication device 144 can take the form of a graphical output device, such as a conventional display screen, for example. In such case, control system 130 can, optionally, include and/or otherwise interface with one or more additional user communication devices. For example, a tactile input device 148, such as a keyboard or a keypad, for example, can, optionally, be communicatively coupled with controller 132 in a suitable manner, such as by way of electrical conductors or leads 150, for example. As another example, an audible output device 152, such as a speaker, for example, can, optionally, be communicatively coupled with controller 132 in a suitable manner, such as by way of electrical conductors or leads 154, for example. As a non-limiting example, visual communication device 144 (e.g., a capacitive or resistive touch screen) and/or tactile input device 148 can be used to identify, select and/or otherwise input one or more details and/or specifications associated with wheel assemblies 108 and/or 118 of vehicle 100 (e.g., the make, model, size, inflation pressure and/or position of a given tire relative to a specific one of sensing devices 128). As another non-limiting example, visual communication device 144 and/or audible output device 152 can be used to notify an operator of information, details and/or events associated with the use and/or operation of one or more of wheel assemblies 108 and/or 118 (e.g., the identification of a foreign object lodged on or within a specific tire of the vehicle).

As discussed above, one disadvantage of known electronic systems that are used to monitor tire tread wear is the sensitivity of such systems to foreign matter and debris that can be on the tire and/or within the tire tread. That is, known electronic systems are thought to be deficient and operate at reduced accuracy and/or provide erroneous results when foreign matter and/or debris is on the surface of or within the tread features of a tire that is being monitored. Whereas, tire sensing systems and methods in accordance with the subject matter of the present disclosure can accurately measure tire wear by observing reflections of radar signals from the tire surface and grooves even in the presence of foreign matter and debris. That is, in accordance with the subject matter of the present disclosure, it has been discovered that the use of sensing devices that operate within the millimeter-wave ("mmWave") band of the radio frequency ("RF") spectrum can overcome or otherwise avoid these and/or other deficiencies of known electronic systems. As such, sensing devices 128 are preferably of a type, kind and/or construction that send and/or receive electromagnetic waves having a frequency within a range of from approximately 30 GHz to approximately 300 GHZ and/or a wavelength within a range of from approximately ten (10) millimeters to approximately one (1) millimeter. As one non-limiting example of sensing device 128 can include any suitable number of one or more mmWave transmitting devices, such as are collectively schematically represented in FIG. 5 by box 128T and any suitable number of one or more mmWave receiving devices, such as are collectively schematically represented in FIG. 5 by box 128R. In some cases, sensing device 128 can be of a type and/or kind that operates as a frequency-modulated continuous wave radar sensor. As a non-limiting example, sensing device 128 can have an approximately 4 GHz bandwidth operating within a frequency range of from approximately 76 GHz to approximately 81 GHz could be used. One example of such a sensing device is available from Texas Instruments Incorporated of Dallas, Texas under the designation AWR1642. It will be appreciated, however, that such a sensing device is merely exemplary and that other sensing devices could alternately be used without departing from the subject matter of the present disclosure.

Figure 3:
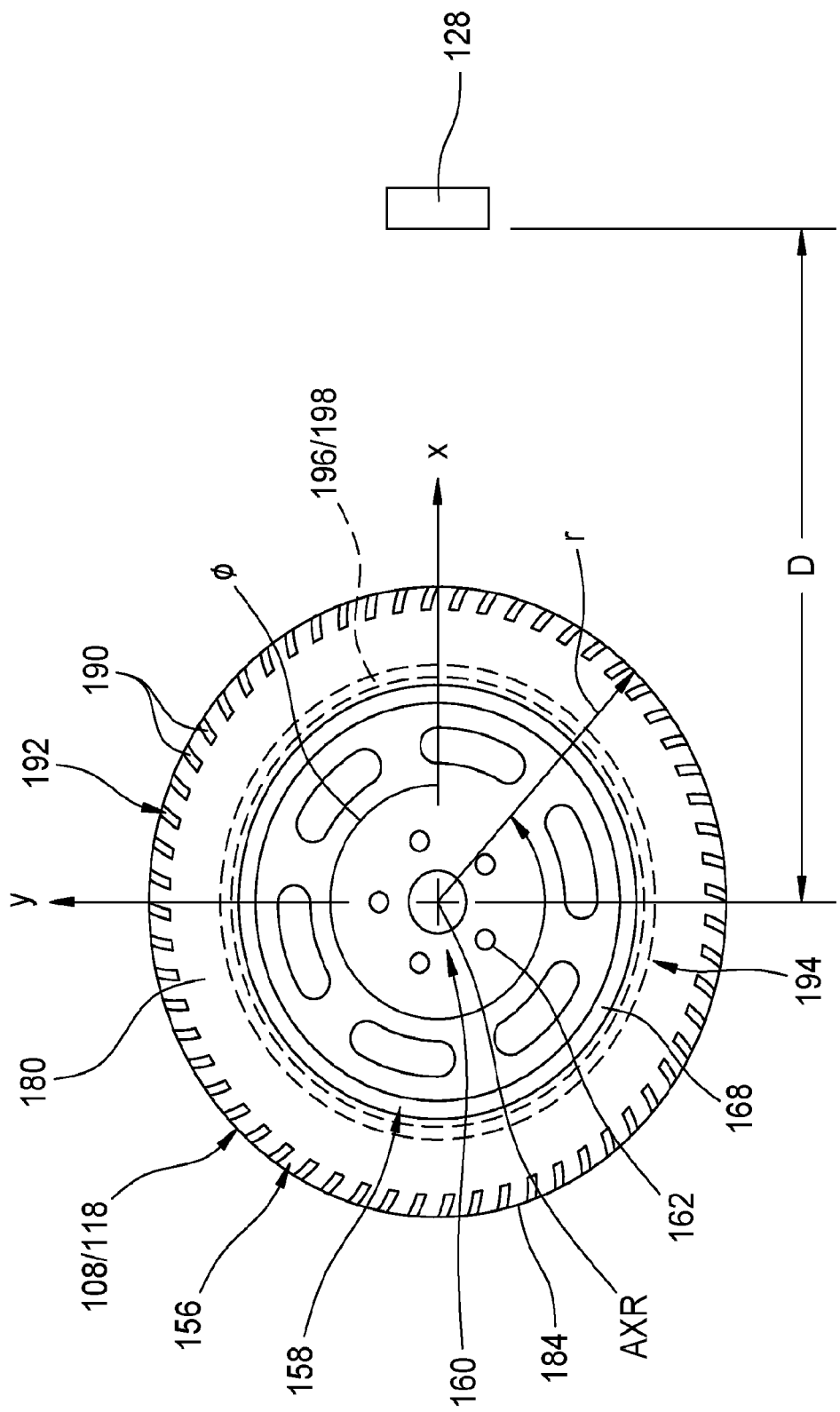
FIG. 3 is a side elevation view of one example of a coordinate system suitable for use in connection with a tire sensing system in accordance with the subject matter of the present disclosure.
Figure 4:
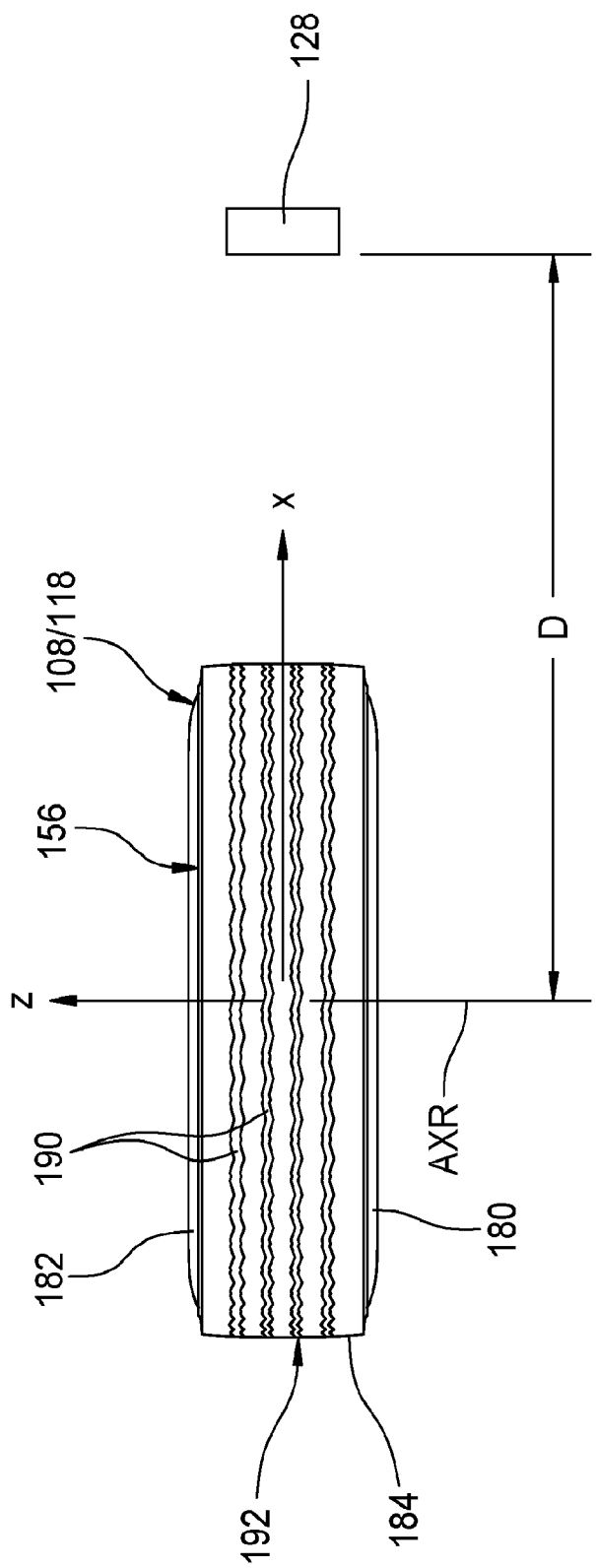
FIG. 4 is a top plan view of the exemplary coordinate system in FIG. 3.

FIGS. 3 and 4 illustrate one example of a coordinate system that can be utilized in connection with a tire sensing system (e.g., tire sensing system 126) in accordance with the subject matter of the present disclosure. As shown therein, wheel 108/118 has an axis of rotation AXR, and a conventional cartesian coordinate system has its origin at the midline of wheel 108/118 with the "x" axis oriented approximately horizontally, the "y" axis oriented approximately vertically and the "z" axis coaxial with axis of rotation AXR. It will be appreciated, however, that other orientations of the x and y axes relative to the horizontal and vertical conventions can alternately be used. Sensor 128 is spaced a distance "D" from the origin in the "x-y" plane. In some cases, distance D can be at least approximately aligned with one of the x or y axes. Though it will be appreciated that any other suitable orientation could alternately be used.

It is well recognized that the range resolution of a mmWave radar sensor is given by the relationship $c/2B$ where c is the speed of light and B is the bandwidth of the radar sensor. With an approximately 4 GHZ bandwidth, the range resolution of an exemplary mmWave radar sensor, such as sensing devices 128, for example, is approximately 3.75 centimeters, which is substantially greater than the tread depth variation of approximately two (2) millimeters to approximately twenty (20) millimeters for conventional over-the-road tires. As a result, reflections from both the outer surface of a tire and the groove of the tire can be less than the best resolution of such exemplary mmWave radar sensors and, thus, indistinguishable depending on the operational characteristics of the sensors that are used. As such, in accordance with the subject matter of the present disclosure, tire sensing system 126 can, optionally, utilize an Inverse Synthetic Aperture Rader ("ISAR") process together with sensors 128 to exploit the natural rotation of the wheel around axis of rotation AXR and improve the measurement resolution to the sub-millimeter range such that a radial difference between the outer surface of the tire and the depth of the tire tread grooves can be measured with a high degree of accuracy. It will be appreciated, however, that such an ISAR process is optional and that a tire sensing system in accordance with the subject matter of the present disclosure can operate without such an ISAR process depending on the radial resolution of measurements that is desired and the operational characteristics of the sensing devices used.

For convenience in implementing the ISAR process, a cylindrical coordinate system is oriented relative to wheels 108/118 and sensors 128 such that the journey of a given imaginary point GPT (FIG. 5) on the surface of the tire can be modeled and measured or otherwise ranged from different perspectives as the wheel rotates. In this respect, the origin of the cylindrical coordinate system is positioned along axis of rotation AXR of the wheel, as shown in FIG. 3, with the letter "r" representing a radial direction, the Greek letter phi "φ" representing an Azimuth or angular position, as shown in FIG. 4.

With reference, now, to FIGS. 3-6, wheel assemblies 108 and/or 118 can include a tire 156 installed on a wheel or rim 158 that permits operation and use of the tire on a wheeled vehicle. It will be appreciated that wheel assemblies 108 and 118 together with tires 156 and rims 158 thereof are merely exemplary and that tires and/or rims of any other type, kind, construction and/or configuration can alternately be used. For example, tires 156 are shown and described herein as being of a type, kind and construction that is commonly referred to as pneumatic tires that utilize a quantity of pressurized gas (e.g., compressed air) contained therein as a working medium. It will be appreciated, however, that the subject matter of the present disclosure is broadly applicable to tires of any type, kind, construction and/or configuration that include any combination of tread-defining features on or along an exterior and/or rolling surface thereof (e.g., longitudinal grooves, lateral grooves, ribs, blocks, sipes) and that the tires and rims shown and described herein are merely exemplary and not to be interpreted as limiting.

Figure 6:
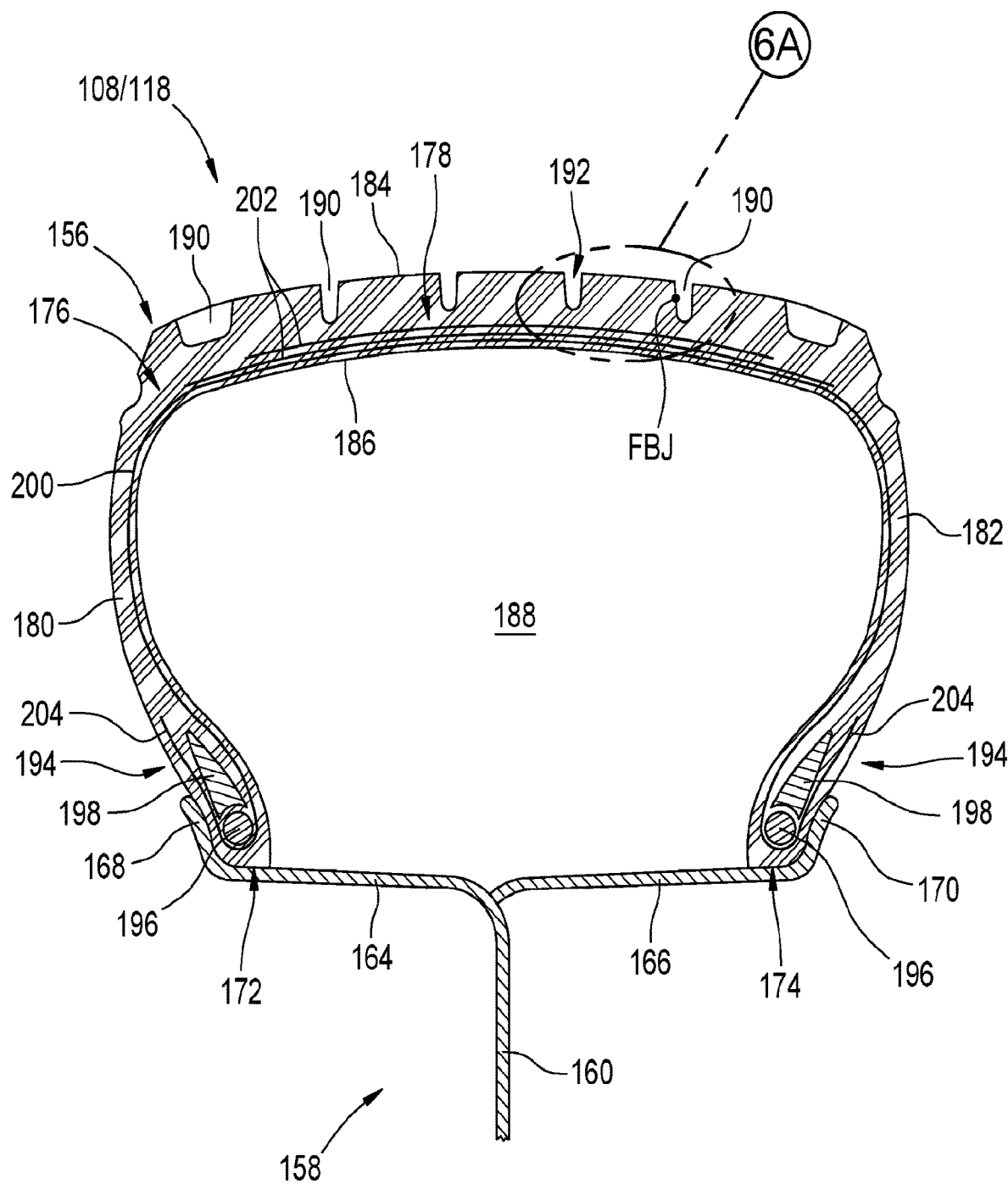
FIG. 6 is a cross-sectional view of the wheel assembly in FIGS. 1-5 taken from along line 6-6 in FIG. 5.

As such, for purposes of discussion, rim 158 is shown as including a mounting hub 160 having a plurality of mounting holes 162 in a suitable hole pattern. As shown in FIG. 6, rim 158 also includes opposing rim walls 164 and 166 that terminate at corresponding flanges 168 and 170. Bead seats 172 and 174 are respectively formed along rim walls 164 and 166 adjacent flanges 168 and 170. Tire 156 extends circumferentially about axis of rotation AXR and includes an elastomeric casing 176 that has a crown portion 178 and axially-spaced sidewalls 180 and 182 that extend radially inward from along crown portion 178. The crown portion includes an outer surface 184 and can, optionally, include an inner surface 186 that can, if included, at least partially define a tire cavity 188. Any combination of one or more lateral and/or longitudinal grooves 190 can be provided along outer surface 184 of crown portion 178 in any desired pattern or configuration to form a tire tread 192, as is well known in the art.

Tires 156 can also include bead areas 194 (which, in some cases, may be alternately referred to as "mounting beads" or "mounting bead areas") that form the radially-inward extent of sidewalls 180 and 182. The bead areas are dimensioned or otherwise adapted to form an air-tight relationship along bead seats 172 and 174 in an installed condition of tire 156 on rim 158. As such, when mounted on a rim as a pneumatic tire, tire 156 can be inflated through a conventional valve (not shown) that is operatively connected with tire cavity 188, such as through one of rim walls 164 and 166 of wheel 158, for example. Additionally, it will be appreciated that bead areas having a wide variety of combinations of shapes, sizes, components, features and elements have been developed and can be included on tire 156. Non-limiting examples of such components, features and elements include bead toe features, bead heel features, bead flippers, bead chippers, and chaffing strips.

Regardless of the one or more other components, features and/or elements that may be included on or along the bead areas of tire 156, the bead areas of the tire can also include at least one bead reinforcing element, such as a bead core 196 and/or a bead filler 198. Bead cores 196 take the form of substantially-inextensible, endless rings that are embedded within bead areas 194. One function of bead reinforcing elements (e.g., bead cores 196) is to establish and maintain the cross-sectional dimension of bead areas 194 and the openings formed thereby such that the tire can be mounted along corresponding bead seats of an associated wheel (e.g., bead seats 172 and 174 of rim 158), such as may be established by industry standards and conventions.

Additionally, tire 156 can also include one or more plies containing a multiplicity of closely-spaced radial reinforcing cords or wires that extend across the crown portion of the tire casing and radially inward along the sidewalls of the tire casing. For example, tire casing 176 is shown as being reinforced by a radial ply 200 that extends across crown portion 178 and along sidewalls 180 and 182 toward bead areas 194. Further reinforcement of the tire can be provided by one or more annular belts, such as belts 202 that extend circumferentially along crown portion 178, for example. Radial ply 200 and belts 202 can be fabricated of any suitable material or combination of materials, such as steel wires or suitable textile fibers, for example, as is well known in the art.

Another function of bead reinforcing elements (e.g., bead cores 196) is to anchor radial plies, such as radial ply 200, for example, as the same extend across the tire carcass between the opposing bead areas. It will be appreciated that such radial plies can be anchored by bead cores 196 in any suitable manner. For example, radial ply 200 is shown in FIG. 6 as extending along sidewalls 180 and 182 toward bead areas 194. Radial ply 200 extends in a radially-inward direction along an axially-inward side of bead core 196 and through the opening formed by the bead core. Outer ends 204 of radial ply 200 are turned up along an axially-outward side of bead core 196 and return in a radially-outward direction along sidewalls 180 and 182. Bead fillers 198 are shown disposed adjacent bead cores 196 in an area between radial ply 200 and outer ends 204, and can operate to at least partially fill any gap between radial ply 200 and outer end 204 and/or can operate to provide added rigidity and/or stiffness to the bead area. It will be appreciated, however, that other arrangements and/or configurations could alternately be used, and that the arrangement shown is merely exemplary.

As discussed herein, tire sensing system 126 is operable to measure and/or monitor tire wear. Additionally, or in the alternative, tire sensing system 126 can, optionally, be operable to identify the presence and location of debris disposed within the tire tread. In some cases, tire sensing system 126 can also, optionally, be operable to categorize any such debris on or along the tire tread. Generally, tire wear corresponds to the erosion of the outer surface of the tire, which reduces the height of ribs, tread blocks and other features originally formed in the tire relative to the root surface portion of tread grooves that at least partially define the ribs, tread blocks and/or other features. It will be appreciated that the root surface portions of such tread grooves generally remain unchanged by tire wear and that the outer surface of the tire moves radially inward toward the root surface portions of the tread grooves as the outer surface of the tire is eroded during use. As such, it will be recognized and appreciated that tire sensing system 126 can be operable to measure tread depth simply as the difference in distance between the outer surface of the tire and the root surface portion of the tire grooves at any given point in time. For convenience, the distance of the outer surface of the tire is represented herein by radius "$r_s$" in FIG. 5 with the distance of the root surface portion of the tire grooves represented by the radius "$r_g$".

Figure 5:
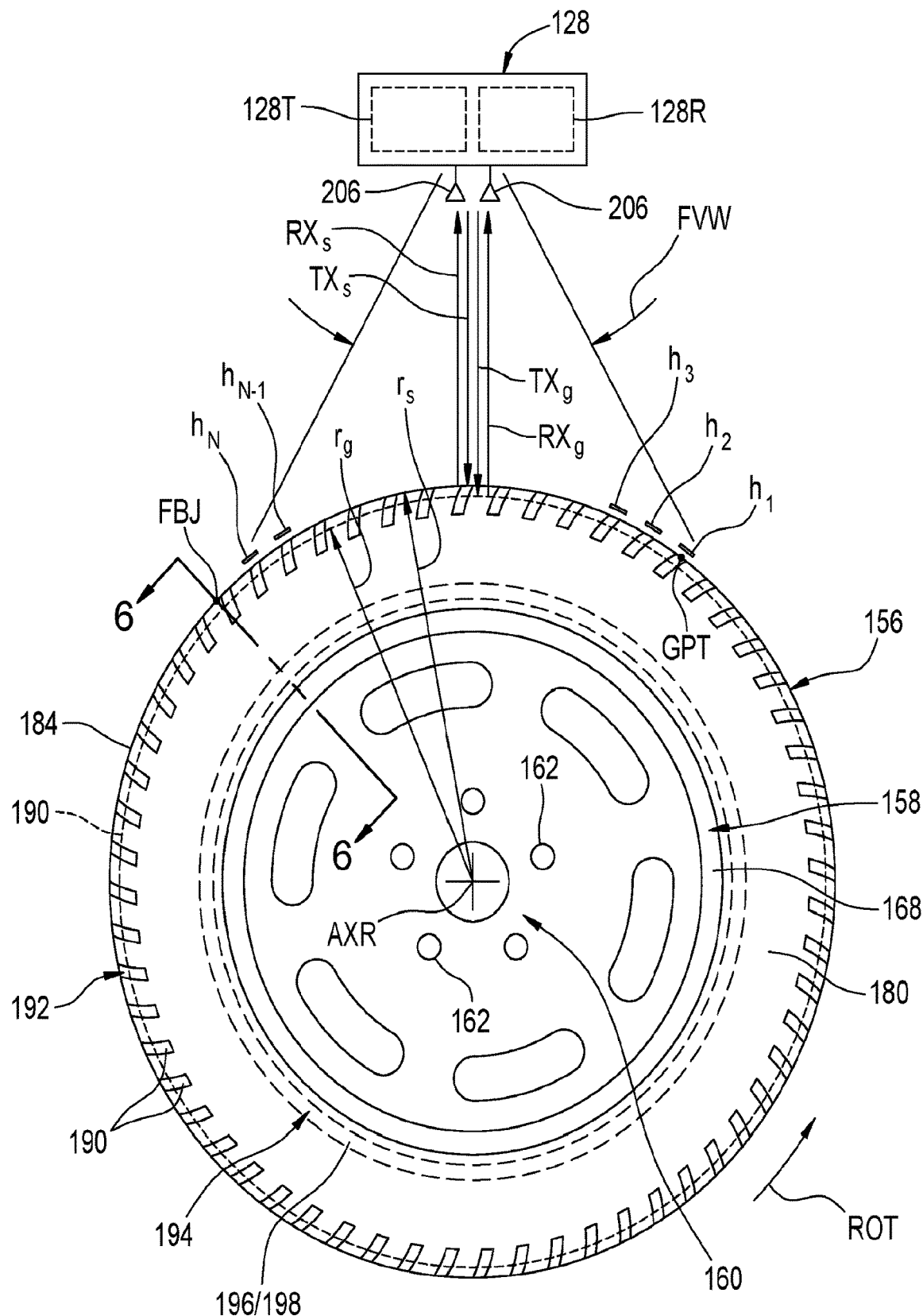
FIG. 5 is a side elevation view of one example of a sensing device positioned adjacent an associated wheel assembly that includes an associated tire with an associated tire tread.

With further reference to FIG. 5, it will be appreciated that wheel assemblies 108 and/or 118 will rotate about axis of rotation AXR during use. In a preferred arrangement, tire sensing system 126 is operable to measure and/or monitor tire tread depth during use in operation, even if at relatively low speeds (e.g., less than 10 miles per hour), such as may be associated with starting and/or stopping the vehicle, for example. It is noted that tire abrasion occurs at relatively slow timescales. As such, periodic measurements, such as may be performed at times when the vehicle is moving at slow speed may be sufficient to adequately monitor tire wear in many circumstances and/or applications in accordance with the subject matter of the present disclosure.

As such, tire 156 is shown in FIG. 5 as undergoing angular displacement about axis of rotation AXR, such as is indicated by rotation arrow ROT, for example. In such case, tire sensing system 126 can exploit rotational movement of tire 156 to improve spatial resolution with respect to the distance resolution available from the sensing devices alone, as discuss above. Sensing devices 128 are positioned adjacent one of wheel assemblies 108 and/or 118 such that antennas 206 of the sensing devices are facing toward tire 156. As such, sensing devices 128 have a field of view of the tire tread along outer surface 184 of tire 156, such as is represented in FIG. 5 by reference dimension FVW. As tire 156 rotates and given imaginary point GPT travels into and through field of view FVW, sensing devices 128 image the tire surface by transmitting and receiving mmWave radar signals, such as are respectively represented in FIG. 5 by arrows $TX_s$ and $RX_s$ for the tire surface and/or arrows $TX_g$ and $RX_g$ for the tread groove surface portion. Signals transmitted and/or received by sensing device 128 as given imaginary point GPT travels into, through and then out of field of view FVW are represented in FIG. 5 by functions $h_1$ to $h_N$, which can be summed or otherwise combined to develop images of the tire surface, as discussed hereinafter.

That is, tire sensing system 126 measures the depth of different points along the surface of tire 156 using sensing device 128. Tire sensing system 126 integrates or otherwise combines signal reflections from the same point (e.g., given imaginary point GPT) as the tire rotates. That is, the received signals at sensing device 128 are the sum of reflected signals that impinge on multiple points along the surface of tire 156. As the tire rotates, these points rotate as well at a rate corresponding to the speed of the tire. Some points progressively disappear from view as the points move beyond field-of-view FVW of sensing device 128, while others appear into view along the other side of the field of view. Tire sensing system 126 utilizes such tire surface trajectories to isolate signals received from across points on the surface of the tire. In this respect, tire sensing system 126 models the journey of an imaginary point on the surface of the tire to ascertain its dimension. Then by definition, radius $r_s$ directly relates to tread depth, as any wear of the tread automatically results in an equal reduction in radius $r_s$, such as has been discussed above.

The journey of given imaginary point GPT that traverses (r, $\phi$(t), z) over time denotes the changing azimuth as wheel assembly 108/118 rotates. Where d(t) denote the distance between the points (r, $\phi$(t), z) and (D, O, O), the wireless channel contribution at any time over the trajectory of point X, $h_X(t)$ due to the reflection of the signal from the sensing device off the point is given by the relationship:

$$h_X(t) = \frac{1}{2d(t)} e^{-j4\pi d(t)/\lambda}$$

where $\lambda$ denotes the wavelength. Tire sensing system 126 is operative to isolate the signal along any point located at (r, $\phi$(t), z) at t=0 therefore actively projects the received channel along $h_X(t)$. A modified Bartlett algorithm for Inverse Synthetic Aperture Radar, akin to an inverse spatial Fourier transform, can be used to account for rotation of tire 156. In such case, the power of the received signal reflected off the given imaginary point GPT (i.e., (r, $\phi$(t), z)) on the tire as:

$$P(r, \varphi(0), z) = \sum_t h(t) e^{+j4\pi d(t)/\lambda}$$

where $h_X(t)$ is the wireless channel read at time t.

Sensing devices 128 can include a plurality of antennas, such as from two to twenty antennas, for example. In such cases, the above process can be co-optimized across antennas, such as by laying the multiple antennas along the z-axis. Similar to the above discussion, wireless channels of reflection can be created from a point for each antenna and then summed over the projection across all antennas in addition to summing across time. A modified Bartlett algorithm can be used at least partly because of the non-uniformity of the rotation of a tire, where tires often rotate at uneven speeds or packet samples from the sensing devices are obtained at unequal times. It will be appreciated, however, that other antenna algorithms, such as MUSIC or ESPRIT, could alternately be used.

The above formulation assumes perfect awareness of the rotational dynamics of a tire over time. However, several dynamics of the tire may make movements irregular and often noisy or unpredictable. As such, it is beneficial for tire sensing system 126 to be resilient to fluctuations in tire and/or vehicle dynamics. For example, vehicles routinely experience vibrations due to operation of the motor with different parts of the vehicle vibrating differently, such as the body or wheel well of the vehicle vibrating at a different amplitude than the tire. In an effort to address such undesired inputs, average measurements can be taken across several packets and outlying value measurements dropped to discount spurious readings due to vibrations. Additionally, or in the alternative, the z-coordinate of any point on the surface of tire 156 can be modeled as being fixed as the tire rotates about axis of rotation AXR. As such, misalignment of the tire can cause variations in the z-values as the tire rotates, which can, in turn, generate spatial distortions and/or skewing of the boundary of the tire surface. Tire sensing system 126 can account for tire misalignment by measuring or otherwise determining the skew of known features (e.g., tread boundaries) along the z-axis. In some cases, tire sensing system 126 can utilize a cubic-spline interpolation of the skew to estimate a corresponding offset in z-values as a function of time. The tire sensing system can then evaluate sensed data with an appropriate offset in z-values over time.

Figure 8:
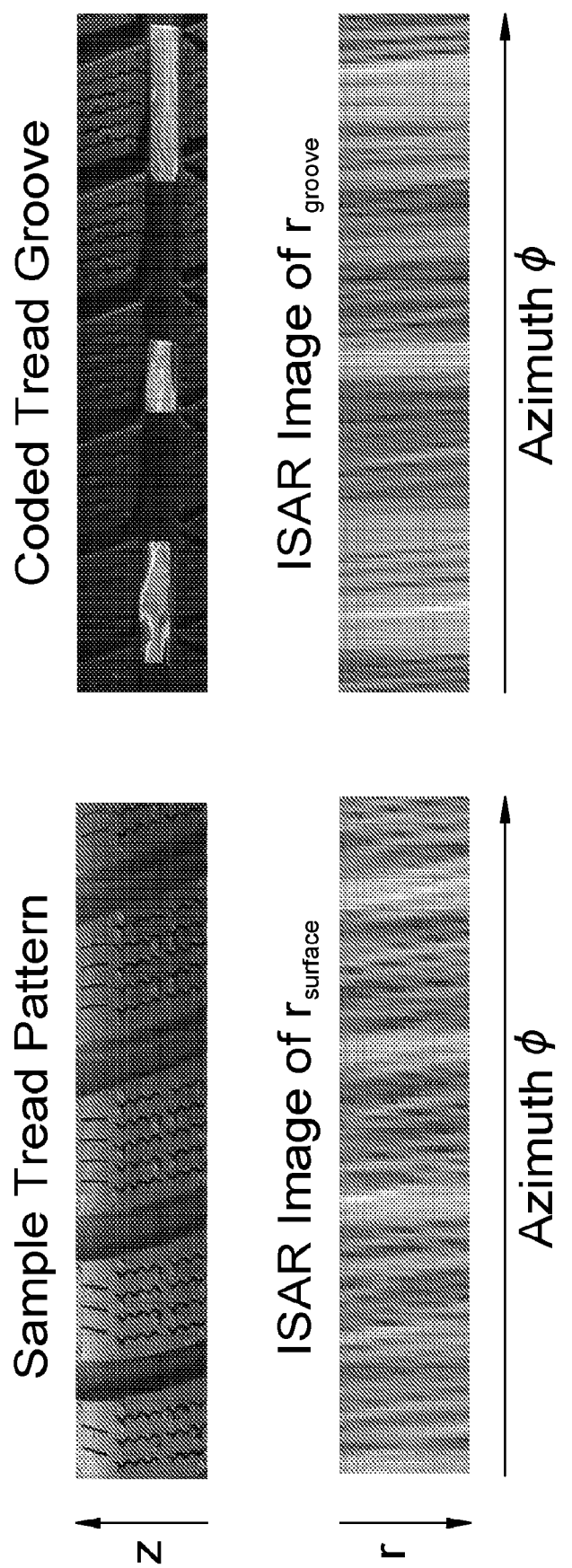
FIG. 8 is a diagrammatic comparison of an exemplary tire tread pattern and an exemplary coded groove thereof with corresponding image data from a tire sensing system in accordance with the subject matter of the present disclosure.

Additionally, it may be desirable to isolate reflected signals associated with the surface of tire 156 from other sources of reflected signals, such as reflected signals from the wheel well of a vehicle, metallic parts of the vehicle, and/or even objects along the road surface. Such extraneous reflectors can cause spurious peaks to appear within the measured ISAR image. In some cases, tire sensing system 126 can utilize tread pattern data corresponding make, model and size of tire 156, such as may be provided manufacturer specifications, for example. As indicated in FIG. 8, for example, such a tread pattern is present in the corresponding ISAR image, where grooves, blocks and/or other features of tire tread 192 produce variations along radial and azimuthal axes (r and $\phi$). FIG. 8 depicts a sample tire tread pattern and a corresponding ISAR image in which the surface plot depicts $P(r, \phi, z)$, where $\phi$ and r denote the x and y axes, respectively, and pixel intensity denotes the value of $P(r, \phi, z)$. It is noted that the tire tread pattern closely aligns with the corresponding ISAR image. As a result, tire sensing system 126 can effectively identify points on the surface of the tire by correlating the ISAR image with known tread pattern data.

In some cases, tire sensing system 126 can account for variations in tire speed in addition to the explicit accounting for tire speed in the evolution of $\phi(t)$, such as may aid in avoiding marginally stretching or squeezing of tread images based on whether the tire speed was over-estimated or under-estimated. Additionally, or in the alternative, sharp edges along the tread could appear unduly smooth owing to vibrations and tire dynamics. In some cases, tire sensing system 126 can, optionally, account for these and/or other effects by applying a spatial smoothing Gaussian function (with the width thereof determined by the resolution of the image) on the known a tread pattern. Further, rather than applying a standard matched filter, tire sensing system 126 can, optionally, applies a 2D version of Dynamic Time Warping, such as may be used in speech and image processing, to correct for minute spatial stretches and squeezes of the signal received from the tire. If included, such techniques can permit tire sensing system 126 to spatially map the precise locations of the surface of the tire between the grooves. Tire sensing system 126 can then average the depth information (defined by r) obtained at these locations across rotations of the tires to report radius $r_s$, which corresponds to the location of outer surface of tire 156.

Additionally, or in the alternative, tire sensing system 126 can also, optionally include background subtraction as a signal processing technique to combat signal multipath from spurious objects around the tire. If utilized, tire sensing system 126 can subtract out received signals along two different time windows to preserve dynamic artifacts (e.g. the tire) while canceling out static objects (e.g. the wheel well of a vehicle). Such techniques can, if included, effectively remove the static objects (relative to the vehicle) that are proximate to the tire, such as the body or wheel well of the vehicle, for example. Background subtraction when applied to two adjacent ISAR images across time can also reveal another effect—spurious objects that appear on the surface of the tire, such as debris (e.g., mud picked up by the tire) that soon after dissipates due to abrasion. In some cases, tire sensing system 126 can effectively be resilient to such distortions to surface depth measurements by identifying and rejecting these outliers. It will be recognized and appreciated, however, that there is a difference in the effect of debris on the tire surface versus the groove. While debris on the tread surface inevitably wears away due to abrasion with the road surface resulting in (at worst) local and short-term uncertainty, debris on the groove of the tire can settle in and create long-term errors in measurement.

One aspect of the approach to sensing the depth of the grooves of a tire used in connection with tire sensing system 126 relates to performing such sensing in the presence of debris (e.g. mud, stones, soil, etc.) within the grooves, which may cause spurious reflections of signals to and/or from sensing device 128 that can partially and/or completely mask the true reflected signal from the tire. In some cases, tire sensing system 126 can address such challenges by developing differentially-reflective structures that are disposed on or along the tire, such as within one or more tire grooves, for example.

Figure 7:
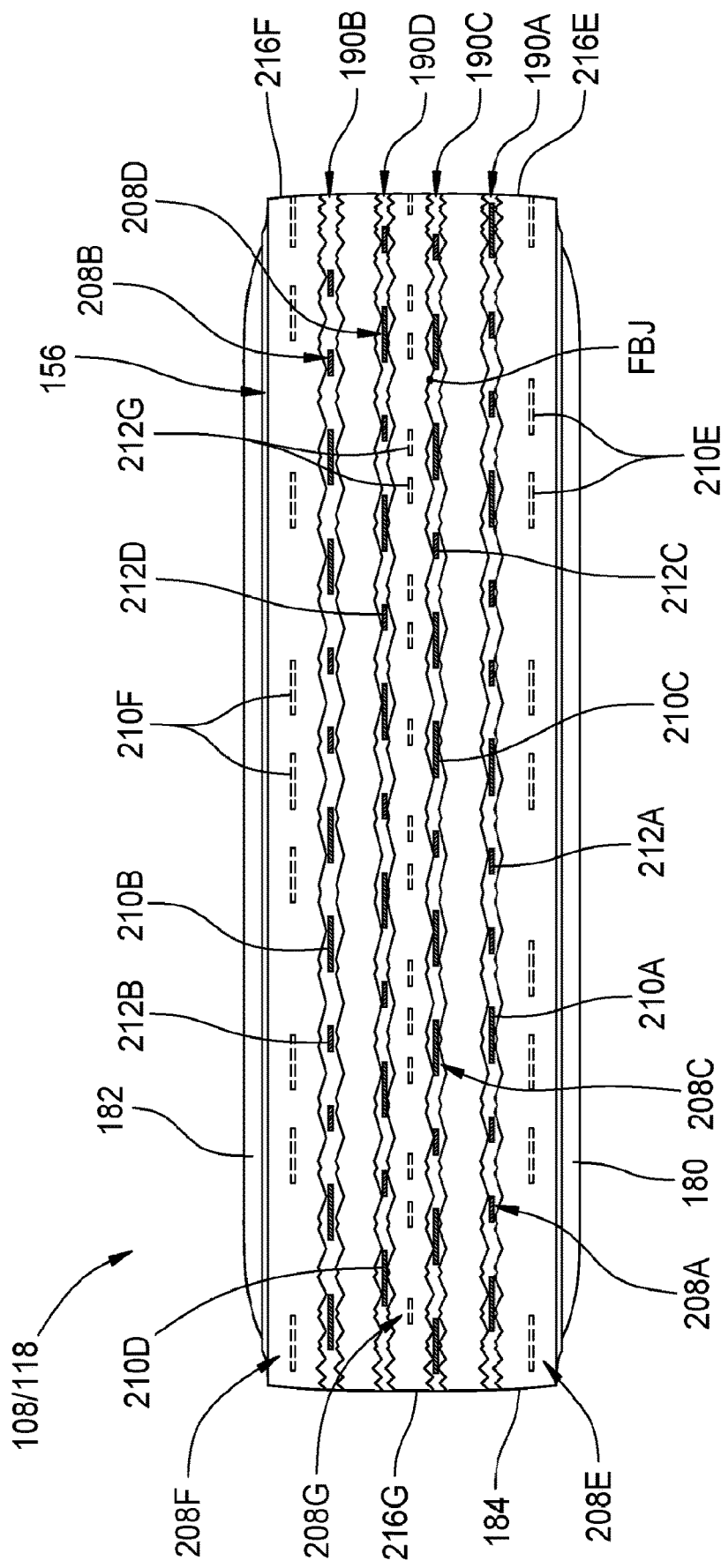
FIG. 7 is a top plan view of the associated tire in FIGS. 1-6 illustrating examples of differentially-reflective structures positioned along the associated tire tread thereof.

As such, tire sensing system 126 can, optionally, be configured to identify, locate and/or otherwise sense differentially-reflective structures disposed on or along an associated tire, such as tire 156, for example. If included, such one or more differentially-reflective structures can behave as spatial codes that can offer a unique and/or identifiable angular position and/or a unique and/or identifiable lateral position as the tire undergoes angular displacement. It will be appreciated that any such one or more differentially-reflective structures, if included, can be positioned or otherwise disposed on or along tire 156 in any suitable configuration and/or arrangement. Various non-limiting examples of suitable configurations and/or arrangements are shown in FIG. 7. In a preferred arrangement, at least one circumferential sequence of differentially-reflective structures are included on or along the tire. In some cases, a circumferential sequence of differentially-reflective structures can be at least partially disposed within one of grooves 190. In other cases, a circumferential sequence of differentially-reflective structures can, optionally, be at least partially disposed on or along a circumferential row of blocks and/or an annular rib of the tire.

In accordance with the subject matter of the present disclosure, the quantity, configuration and position of two or more differentially-reflective structures included in a given circumferential sequence disposed on or along a tire can vary depending on the desired resolution with which angular orientation is desired. That is, a greater number of differentially-reflective structures can be used to provide increased angular resolution. Additionally, it will be appreciated that the quantity of one or more circumferential sequences of differentially-reflective structures disposed around a tire can vary depending on the desired localization of tire sensing on or along the z-axis that is desired. That is, in some cases, a single circumferential sequence of differentially-reflective structures could be used. Alternately, two or more unique or otherwise distinguishable circumferential sequences of differentially-reflective structures could be disposed in axially-spaced relation to one another along the z-axis, such as may permit different portions of the tire tread in spaced relation to one another along the z-axis can be independently identified, measured and/or otherwise monitored.

In the exemplary arrangement in FIG. 7, tire 156 is shown as including a circumferential sequence 208A of differentially-reflective structures 210A and 212A disposed on or along a root surface portion 214 (FIGS. 6A-6C) of groove 190A. Additionally, or in the alternative, tire 156 can, optionally, include a circumferential sequence 208B of differentially-reflective structures 210B and 212B disposed on or along root surface portion 214 of groove 190B. Furthermore, or as a further alternative, tire 156 can, optionally include a circumferential sequence 208C of differentially-reflective structures 210C and 212C disposed on or along root surface portion 214 of groove 190C. Further still, or as yet another alternative, tire 156 can, optionally include a circumferential sequence 208D of differentially-reflective structures 210D and 212D disposed on or along root surface portion 214 of groove 190D. In addition to, or in the alternative to, including one or more differentially-reflective structures within one or more portions of one or more grooves of tire 156, differentially-reflective structures can, optionally, be included on or along one or more annular ribs and/or tread blocks of the tire. As a non-limiting example, tire 156 can include a circumferential sequence 208E of differentially-reflective structures 210E disposed on or along a circumferential rib portion 216E of tire 156. As another non-limiting example, tire 156 can include a circumferential sequence 208F of differentially-reflective structures 210F disposed on or along a circumferential rib portion 216F of tire 156. As still another non-limiting example, tire 156 can include a circumferential sequence 208G of differentially-reflective structures 212G disposed on or along a circumferential rib portion 216G of tire 156.

It will be appreciated that any combination details and/or features can be used to distinguish differentially-reflective structures from one another. For example, in some cases, differentially-reflective structures of different shapes and/or sizes can be used. Additionally, or in the alternative, differentially-reflective structures having different circumferential spacings can be use. Furthermore, or as a further alternative, two or more differentially-reflective structures that are distinguishable from the predominant base material of tire 156 and also distinguishable from one another could be used. It will be recognized and appreciated that the type, kind, condition and configuration of material that at least partially defines the differentially-reflective structures can vary depending on desired level of distinguishability with the predominant base tire material that is in use and/or the level of noise present in the system. As one non-limiting example, thin strips of metal material (e.g., aluminum) having a comparatively high reflectivity relative to rubber compounds from which tires are commonly manufactured can be used. It will be appreciated, however, that the foregoing is merely exemplary and that any other suitable material or combination of materials can be used without departing from the subject matter of the present disclosure.

Figure 6A:
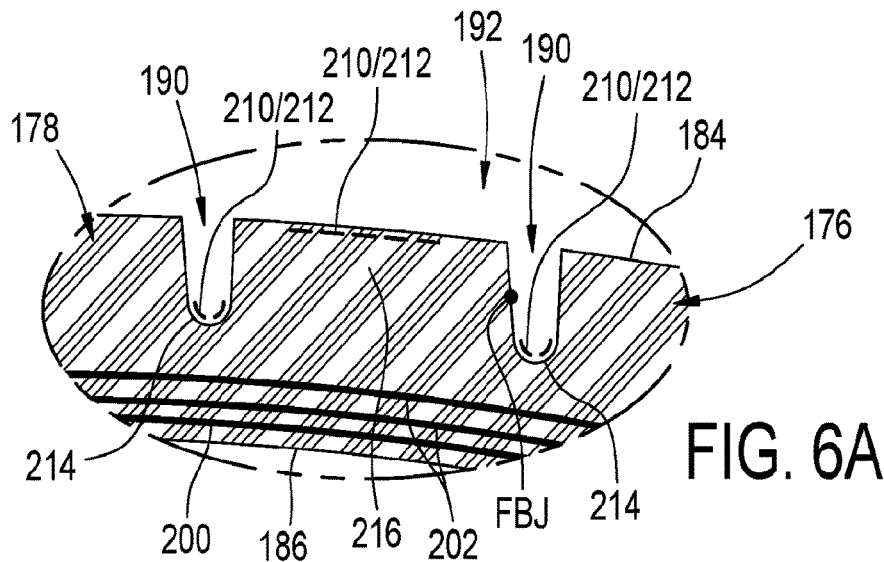
FIGS. 6A-6C are cross-sectional views of enlarged portions of the associated tire in FIG. 6 identified as Detail 6A and schematically illustrating differentially-reflective structures operatively disposed along tire tread grooves.
Figure 6B:
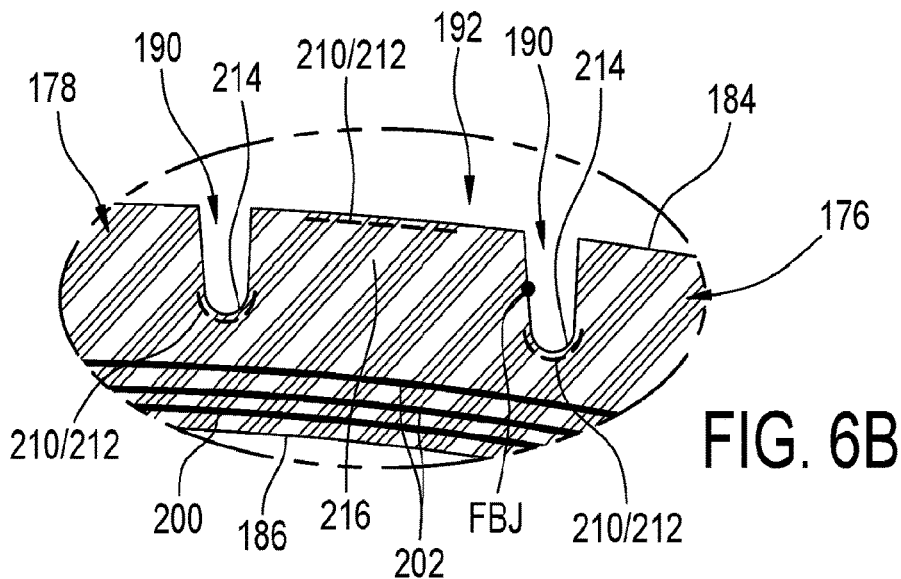
Figure 6C:
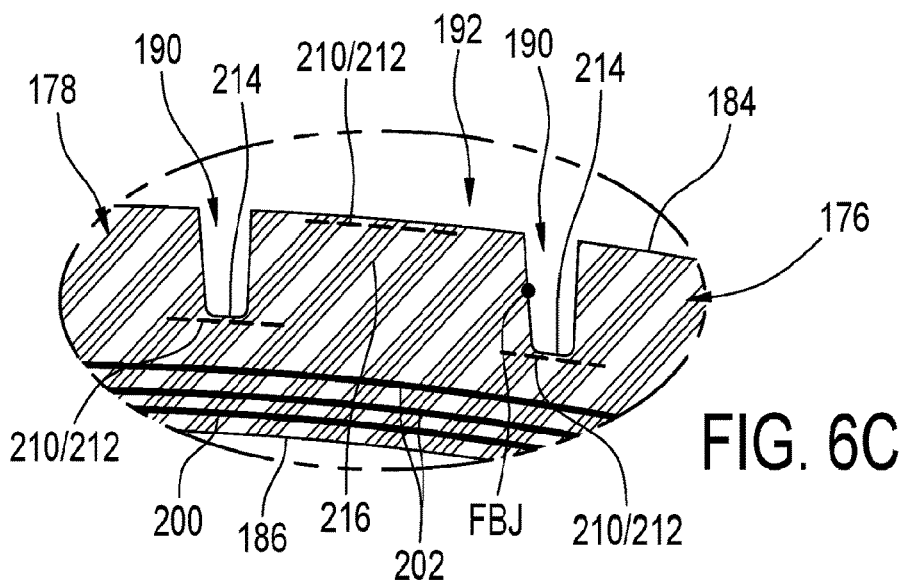

Additionally, it will be appreciated that the one or more differentially-reflective structures, if included, can be operatively attached or otherwise provided on or along tire 156 in any suitable manner. As one non-limiting example, differentially-reflective structures 210 and/or 212 can be secured within grooves 190 on or along root surface portion 214, for example, such as is shown in FIG. 6A, for example. As another non-limiting example, differentially-reflective structures 210 and/or 212 can be secured within the material of elastomeric casing 176 such that at least a portion of differentially-reflective structures 210 and/or 212 are reflectively effective from within and/or along grooves 190, such as is shown in FIG. 6B, for example. As still another non-limiting example, differentially-reflective structures 210 and/or 212 can be disposed on or along a circumferential layer of fabric material that is at least partially embedded within the material of elastomeric casing 176 and reflectively effective from within and/or along grooves 190, such as is shown in FIG. 6C, for example. It will be appreciated, however, that other configurations and/or arrangements could alternately be used without departing from the subject matter of the present disclosure.

It is well understood that root surface portions 214 of grooves 190 remain spaced from contact with the road surface. As such, comparatively thin segments material can be used to form differentially-reflective structures 210 and/or 212 without significantly reducing or otherwise influencing the overall depth of the grooves. As indicated above, reflective metallic materials may be preferred in some cases, as such materials can provide strong reflections capable of penetrating debris. It is to be distinctly understood, however, that other materials and/or combinations of materials can be used without departing from the subject matter of the present disclosure. With respect to the circumferential sequence or sequences of differentially-reflective structure, the same can have a resemblance to barcodes with a pre-designed layout akin to a spatial code. Such circumferential sequences or codes can permit tire sensing system 126 to explicitly look for reflections from a specific code in a specific groove within the reflected signal from the tire. Under certain conditions, such operability can help isolate the signal from the groove of the tire from all other reflections (e.g. debris within the groove), both due to high reflectivity of the metal material (if metal material is used) and the coding gain of the spatial code. Additionally, or in the alternative, tire sensing system 126 can use a such circumferential sequences as encoders to measure or otherwise identify the angular position of a tire relative to sensing device 128.

It will be appreciated that differentially-reflective structures and circumferential sequences on or along the tire groove can aid in determining the depth of the groove with relatively high accuracy, despite the limited area of the groove itself and/or the potential presence of debris that may be disposed within the groove. As such, it may be desirable for differentially-reflective structures and circumferential sequences to be resilient to debris by ensuring that the structures reflect mmWave radiation strongly. Additionally, or in the alternative, it may be desirable for differentially-reflective structures and circumferential sequences to be resilient to errors that can stem from foreign objects or debris lodged in the grooves, such as is schematically represented in FIGS. 5, 6 and 6A-6C by reference characters FBJ. Furthermore, or as a further alternative, it may be desirable for tire sensing system 126 to be operable to decode and/or disambiguate signals from differentially-reflective structures and/or circumferential sequences along adjacent grooves. As previously discussed, FIG. 8 depicts a sample tire tread pattern and a corresponding ISAR image in which the surface plot depicts P(r, ϕ, z), where ϕ and r denote the x and y axes, respectively, and pixel intensity denotes the value of P(r, ϕ, z). Again, it is noted that the circumferential sequence of differentially-reflective structures closely aligns with the corresponding ISAR image. As a result, tire sensing system 126 can effectively identify points on the surface of the tire by correlating the ISAR image with known patterns and/or data of differentially-reflective structures and/or circumferential sequences applied to a tire.

As discussed, above, any suitable configuration and/or arrangement of differentially-reflective structures and circumferential sequences can be used. In a preferred arrangement, such differentially-reflective structures and circumferential sequences can utilize a modulation that maps zeros (0s) and ones (1s). In some cases, it may be desirable to include as many bits as possible within the available surface area of the groove. Tire sensing system 126 is preferably resilient to bit errors as well as collisions between differentially-reflective structures and/or circumferential sequences from adjacent grooves. In some cases, differentially-reflective structures and/or circumferential sequences can be encoded by different widths of thin segments of material for pulse width modulation. In other words, differentially-reflective structures and/or circumferential sequences can be encoded in the relative amplitude of the signals reflected off the differentially-reflective structures rather than the phase or sign.

In some cases, differentially-reflective structures and/or circumferential sequences can utilize coded bits of different lengths that are designed to have high auto-correlation and poor cross-correlation. Such an approach is compatible with pulse width modulation, given that it effectively results in marked differences in total amplitude reflected from zero and one bits. While optional, such a configuration can beneficially provide for poor cross-correlation and therefore can have increased resilience to collisions when codes across adjacent grooves need to be disambiguated. Additionally, such configurations are inherently resilient to bit flips showing high robustness to erroneous bits.

The foregoing arrangement can correlate differentially-reflective structures and/or circumferential sequences with different possible known sequences in order to detect the presence of a specific groove, such as may be associated with a given make, model and size of tire, for example. Additionally, such arrangements can directly serve as an encoder as well. Tire sensing system 126 is effective at measuring the precise depth of the grooves of the tire, given the known differentially-reflective structures and/or circumferential sequences that are present, though such structures and/or sequences can, in some cases, experience distortions (e.g. smoothing) owing to the limited resolution of the mmWave radar and the dynamics of tire rotation.

Tire sensing system 126 can calibrate or otherwise adjust for such distortions by utilizing a model $M_{(r,\ \phi(t),\ z)}(C)$ that captures the expected wireless channels from such sequences or codes C accounting for the expected distortion, when moving along the trajectory (r, ϕ(t), z). A relation to the true depth of the groove given by r can then be determined by correlating this model with the received channels. Specifically, the coordinates of the groove can be estimated as:

$$r_g = \underset{r}{\mathrm{argmax}}\ corr(M_{(r,\phi(t),z)}(C), h(t))$$

Values for $r_g$ can be subtracted from prior measurements of $r_s$ of the outer surface of the tire to compute tread depth.

Tire sensing system 126 can, optionally, also be robust to as well as detect and locate foreign objects that may be lodged on or in the tire. Tire sensing system 126 can be operative to determine the location of foreign objects and, optionally, to provide notification of the presence of such foreign objects, such as to an operator and/or a remote data storage or computer system, for example. Tire sensing system 126 can process the output of the ISAR algorithm, which may appear akin to X-ray images showing components lodged within the tire. Multiple ones of such images can be captured as the tire rotates over time. These images can then be stitched together to generate a continuous image of the tire and use the known pattern of differentially-reflective structures and circumferential sequences to determine an approximate location of the foreign object. In some cases, machine learning algorithms can, optionally, be used to distinguish between different types and/or kinds of objects lodged in the tire.

In some cases, the accumulation of foreign objects on the surface of the tire and/or within the grooves thereof can lead to undesirable deviations in range estimations and/or tread depth determinations. As such, in some cases, a foreign-object detection routine or module can be operable as a precursor to a tread depth determination. In such cases, a tread depth determination routine or module may, in some cases, only be executed if the tire is substantially free of foreign objects. The foreign object detection module can be based on extracting features from reflected signatures and inferring from a trained machine learning model to classify into one of a plurality of predefined categories (e.g., That is, anomalies in the ISAR image that appear due to the presence of foreign objects can be detected and located. The shape, intensity, and phase corresponding to these anomalies can be used to classify the type of foreign object, such as by size of foreign object FBJ, the location of foreign object FBJ on or along tire 156 and/or by the material from which foreign object FBJ is at least partially made.

Tire sensing system 126 can, optionally, utilize background subtraction to locate foreign objects on the tire by monitoring the ISAR image for any new reflectors that appear. Tire sensing system 126 can then locate the (r, ϕ(t), z) location of objects that appear in the ISAR image and remain persistent when averaged across multiple frames. Given its high spatial resolution, ISAR images can capture foreign objects FBJ as small as approximately 3 mm on or along the surface of the tire and/or within any grooves thereof. It has been recognized that foreign objects located deep within a groove of a tire may not reflect as strongly as foreign objects located along the outer surface of the tire. As such, tire sensing system 126 can utilize the presence of known differentially-reflective structures and circumferential sequences on the tire to identify areas where deviations from such known differentially-reflective structures and circumferential sequences manifest as bit errors representing potential foreign objects. Tire sensing system 126 can then utilize such deviations to locate and classify the foreign object.

Tire sensing system 126 can classify object types by relying on both the magnitude and the phase of the received signal at a specific (r, ϕ(t), z) location. In some cases, any one or more of three specific properties corresponding to the impact of the foreign object on sensed signals can be used. Such properties can include (1) the amplitude of reflection (stronger for metallic objects); (2) the phase which captures object reflectivity; and/or (3) the shape and size of the object appearing on the ISAR image. As one non-limiting example, a simple linear binary class classifier using Gaussian Mixture Models can be used. Tire sensing system 126 can generate an indication to an operator and/or remote data storage device and/or computer system that a foreign object has been detected as well as the location and/or tread depth of the tire near which the foreign object is located.

Figure 9:
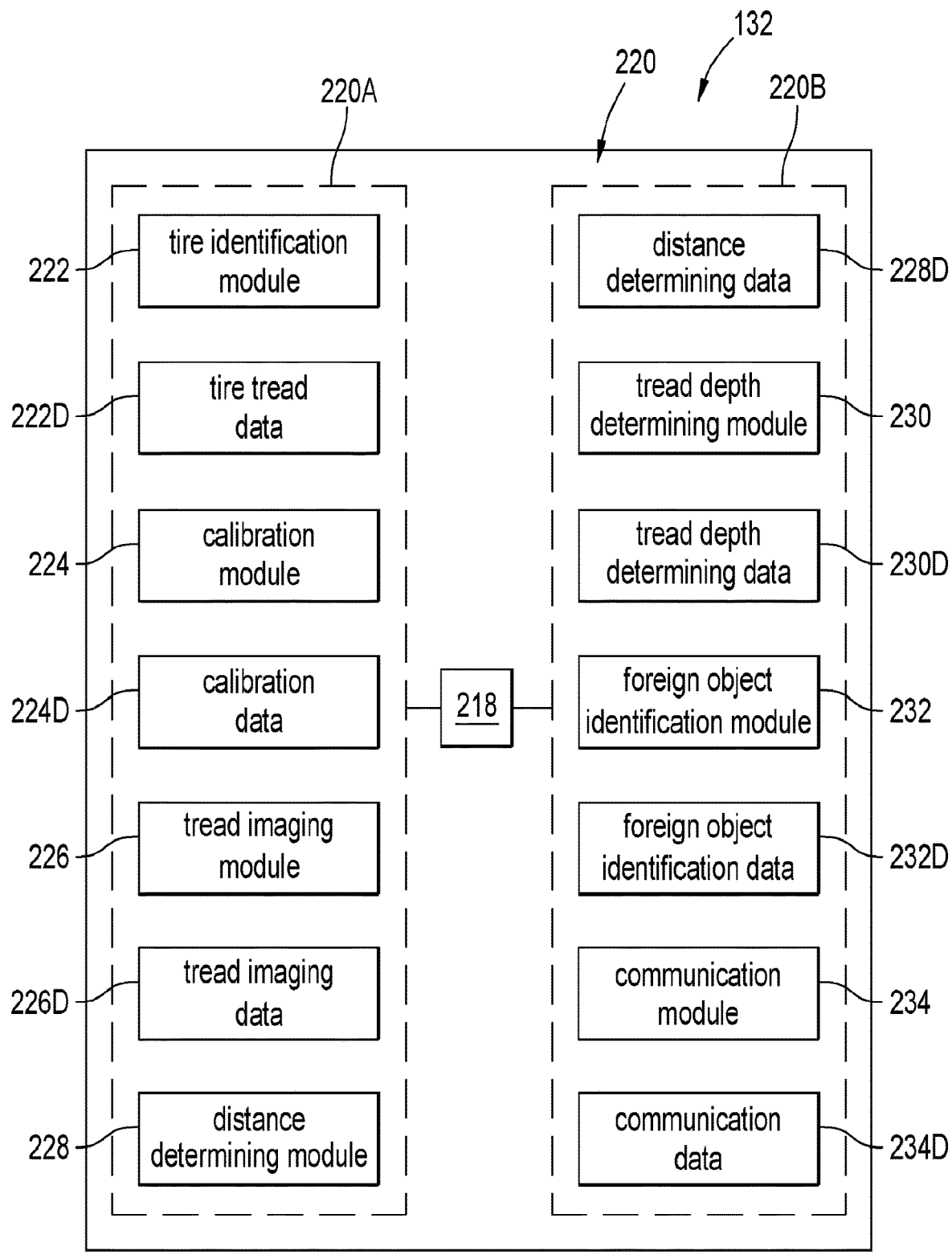
FIG. 9 is a schematic representation of one example of a controller for a tire sensing system in accordance with the subject matter of the present disclosure.

With reference, now, to FIGS. 2 and 9, controller 132 is shown as being communicatively coupled with various devices and components of tire sensing system 126, such as may be suitable for sending, receiving and/or otherwise communicating signals, data, values and/or information to, from and/or otherwise between the controller and one or more of the devices and/or components of the system. It will be appreciated that controller 132 can include any suitable hardware, software and/or combination thereof for configuration and operation of a tire sensing system in accordance with the subject matter of the present disclosure. For example, controller 132 can include a processing device, which can be of any suitable type, kind and/or configuration, such as a microprocessor, for example, for processing data, executing software routines/programs, and other functions relating to the performance and/or operation of tire sensing system 126. Additionally, the controller can include a memory of any suitable type, kind and/or configuration that can be used to store software, parameters, settings, inputs, data, values and/or other information for use in association with the performance and/operation of tire sensing system 126. In the arrangement shown in FIG. 9, controller 132 includes a microprocessor 218 and a memory 220, which is represented by boxes 220A and 220B.

As shown in FIG. 9, controller 132 can, optionally, include a tire identification module 222 that is capable of requesting, receiving, processing, storing and/or otherwise transferring data, values, information, signals and/or communications into and/or out of tire sensing system 126, such as may relate to or be otherwise associated with the type, kind, configuration and/or construction of one or more tires (e.g., tires 156) of vehicle 100. In some cases, tire identification module 222 can request, receive, process and/or store data, values, information, signals and/or communications input by a user, such as by way of visual communication device 144 and/or tactile input device 148. In other cases, tire identification module 222 could receive or otherwise transfer data, values, information, signals and/or communications from a remote data storage device and/or a remote computer, for example, such as by way of interface 140, for example. Non-limiting examples of inputs and selections to which the data, values, information, signals and/or communications could relate can include tire manufacturer, tire model, tire size, installation position on the vehicle, installation date. The data, values, information, signals and/or communications requested, received, processed or otherwise transferred into tire sensing system 126 can be stored in memory 220, such as is represented by box 222D in FIG. 9, for example.

Controller 132 can also, optionally, include a calibration module 224 that is capable of requesting, receiving, processing, storing and/or otherwise transferring data, values, information, signals and/or communications into and/or out of tire sensing system 126, such as may relate to or be otherwise associated with the identification of one or more tires (e.g., tires 156) of vehicle 100, such as by imaging a plurality of differentially-reflective structures and/or circumferential sequences, for example. As another non-limiting example, calibration module 224 can be capable of requesting, receiving, processing, storing and/or otherwise transferring data, values, information, signals and/or communications into and/or out of tire sensing system 126, such as may relate to or be otherwise associated with the rotational dynamics of one or more tires (e.g., tires 156) of vehicle 100, such as by adjusting for spatial distortions, skew and/or other variables associated with dynamic rotation of the tires, for example. The data, values, information, signals and/or communications requested, received, processed or otherwise transferred into tire sensing system 126 can be stored in memory 220, such as is represented by box 224D in FIG. 9, for example.

Furthermore, controller 132 can, optionally, include a tread imaging module 226 that is capable of requesting, receiving, processing, storing and/or otherwise transferring data, values, information, signals and/or communications into and/or out of tire sensing system 126, such as may relate to or be otherwise associated with imaging an external surface of one or more tires (e.g., tires 156) of vehicle 100, such as by operating sensing devices 128 to generate a 3D depth image of at least a portion of the external surface of a tire, applying adjustment data from calibration module 224, performing background subtraction and/or other such functions, as discussed above, for example. The data, values, information, signals and/or communications requested, received, processed or otherwise transferred into tire sensing system 126 can be stored in memory 220, such as is represented by box 226D in FIG. 9, for example.

Further still, controller 132 can, optionally, include a distance determining module 228 that is capable of requesting, receiving, processing, storing and/or otherwise transferring data, values, information, signals and/or communications into and/or out of tire sensing system 126, such as may relate to or be otherwise associated with evaluating image data from tread imaging module 226 having a relation to an external surface of one or more tires (e.g., tires 156) of vehicle 100, such as by determining one or more distances to a surface portion of the tire from a corresponding origin or other reference point, for example. The data, values, information, signals and/or communications requested, received, processed or otherwise transferred into tire sensing system 126 can be stored in memory 220, such as is represented by box 228D in FIG. 9, for example.

Additionally, controller 132 can, optionally, include a tread depth determining module 230 that is capable of requesting, receiving, processing, storing and/or otherwise transferring data, values, information, signals and/or communications into and/or out of tire sensing system 126, such as may relate to or be otherwise associated with a distance, depth or other measure of remaining tread of one or more tires (e.g., tires 156) of vehicle 100, such as by subtracting or otherwise determining a differential between an outer surface portion of the tire and a root surface portion of a corresponding tread groove, for example. The data, values, information, signals and/or communications requested, received, processed or otherwise transferred into tire sensing system 126 can be stored in memory 220, such as is represented by box 230D in FIG. 9, for example.

Furthermore, controller 132 can, optionally, include a foreign-object identification module 232 that is capable of requesting, receiving, processing, storing and/or otherwise transferring data, values, information, signals and/or communications into and/or out of tire sensing system 126, such as may relate to or be otherwise associated with the identification, localization and/or classification of foreign material, debris and/or object disposed on, along and/or embedded within one or more tires (e.g., tires 156) of vehicle 100, such as by employing simple linear binary class classifiers and/or machine learning models, for example. The data, values, information, signals and/or communications requested, received, processed or otherwise transferred into tire sensing system 126 can be stored in memory 220, such as is represented by box 232D in FIG. 9, for example.

As shown in FIG. 9, controller 132 can also, optionally, include a communication module 234 that is capable of requesting, receiving, processing, storing and/or otherwise transferring data, values, information, signals and/or communications into and/or out of tire sensing system 126, such as may relate to or be otherwise associated with communicating with an operator, remote data storage devices and/or remote computer systems characteristics relating to one or more tires (e.g., tires 156) of vehicle 100. Communication module 234 can request, receive, transmit, process and/or store data, values, information, signals and/or communications input from and/or transmitted to by a user, such as by way of visual communication device 144, tactile input device 148 and/or audible output device 152, for example. In other cases, communication module 234 can be operative to transmit, receive or otherwise transfer data, values, information, signals and/or communications to, from and/or otherwise between remote data storage devices and/or remote computer systems, for example, such as by way of interface 140, for example. The data, values, information, signals and/or communications requested, received, processed or otherwise transferred into tire sensing system 126 can be stored in memory 220, such as is represented by box 234D in FIG. 9, for example.

It will be appreciated that the one or more modules of controller 132, which are shown and described herein as modules 222-234, can be provided in any suitable manner, such as software, hardware and/or a combination of hardware and software, for example. In some cases, modules 222-234 can take the form of algorithms, routines and/or programs. If provided in whole or in part as software, the configuration and operation modules of controller 132 can be provided and stored in any suitable manner or arrangement. For example, all of the algorithms, routines and/or programs could be integrated into a single software program in which separate sections or portions of the software code will perform the various actions and/or activities of the system. In another embodiment, two or more independent modules (e.g., algorithms, routines and/or programs) could be used to perform the various actions and/or activities of the system.

Furthermore, memory 220 can store or otherwise retain any suitable data, values, settings, software, algorithms, routines, programs and/or any other information, in any suitable manner or form. And, in a preferred arrangement, microprocessor 218 can be in communication with memory 220 and can be operative to selectively access and/or process one or more of data, values, information, algorithms, routines and/or programs, such as those retained in memory stores 222-234 and/or 222D-234D, for example, alone or in combination. For example, microprocessor 218 can run or otherwise process an algorithm, routine or program, such as from one or more of memory locations 222-234 that is operative to access, analyze or otherwise utilize data and/or information, such as may be stored in one or more of memory locations 222D-234D.

Figure 10:
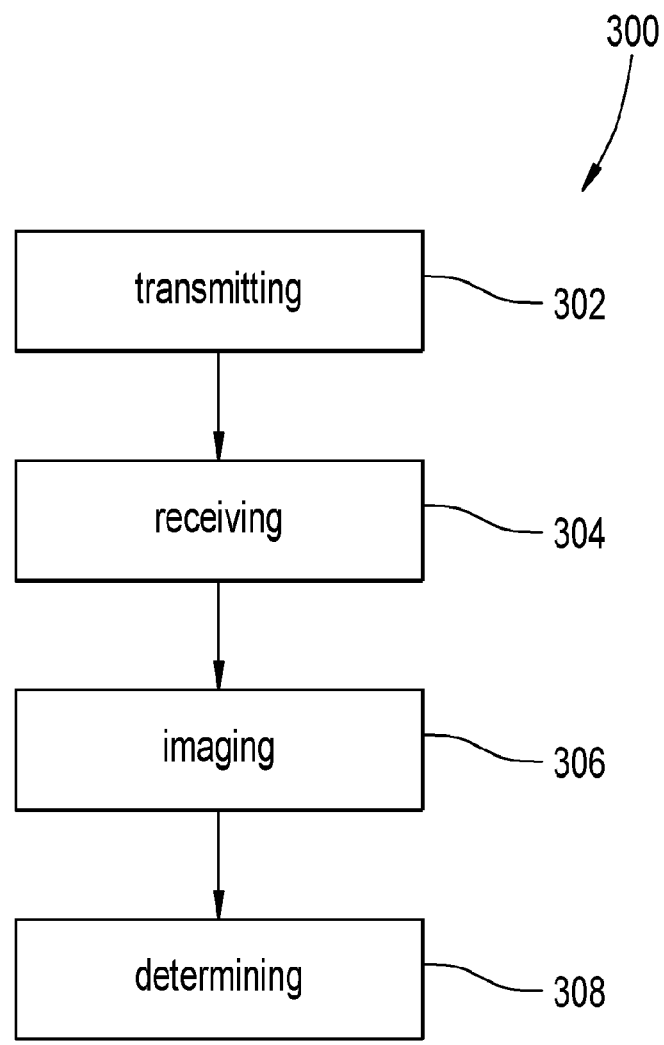
FIG. 10 is a graphical representation of one example of a method in accordance with the subject matter of the present disclosure.

FIG. 10 is a graphical representation of one example of a method 300 of sensing physical characteristics of an associated tire, such as a depth of a tire tread and/or the presence of a foreign object or substance, for example. Method 300 can include transmitting a millimeter wave toward the associated tire, such as is represented in FIG. 10 by box 302. The method can also include receiving a millimeter wave reflected from the associated tire, such as is represented by box 304 in FIG. 10. Method 300 can further include imaging the first and second radial extents of the associated tire using the reflected millimeter wave, such as is represented in by box 306 in FIG. 10. In some cases, the first and second radial extents of the associated tire can respectively correspond to an outer surface and a groove bottom surface of an associated tire. Additionally, in some cases, imaging the first and second radial extents can include using an inverse synthetic aperture radar (ISAR) algorithm. The method can also include determining a dimensional difference between the first and second radial extents of the associated tire, such as is represented in FIG. 10 by box 308.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A tire sensing system operable to determine one or more physical characteristics of an associated tire, said tire sensing system comprising:
a millimeter wave transmitting device;
a millimeter wave receiving device; and,
a processor communicatively coupled with a memory, said memory including instructions to:
transmit a millimeter wave toward the associated tire using said millimeter wave transmitting device;
receive a millimeter wave reflected from the associated tire at said millimeter wave receiving device;
image first and second radial extents of the associated tire based on said received millimeter wave;
determine a dimensional difference between said first and second radial extents of the associated tire;
determine a presence along said first radial extent and/or said second radial extent of the associated tire of an associated foreign substance having at least a predetermined minimum dimension; and
classify the associated foreign substance as belonging to one or more predetermined classes of foreign substances.

2. A tire sensing system according to claim 1, wherein said first radial extent corresponds to an outer surface of the associated tire, said second radial extent corresponds to a groove of the associated tire that at least partially defines an associated tire tread, and said instruction to determine said dimensional difference includes an instruction to determine a radial difference corresponding to a depth of the associated tire tread.

3. A tire sensing system according to claim 1, wherein said instructions to image said first and second radial extents include an inverse synthetic aperture radar algorithm.

4. A tire sensing system according to claim 3, wherein said instructions to determine said presence of the associated foreign substance includes instructions to determine an approximate radial dimension and an approximate angular position of the associated foreign substance on the associated tire in relation to a cylindrical coordinate system with an origin at the center of the associated tire.

5. A tire sensing system according to claim 3, wherein said instructions to image said first and second radial extents of the associated tire includes instructions to measure a skew along a z-axis of the associated tire in relation to a cylindrical coordinate system with an origin at the center of the associated tire, and instructions to estimate a corresponding z-offset as a function of time.

6. A tire sensing system according to claim 3, wherein said memory includes instructions to compare said imaged first and second radial extents of the associated tire with stored image data of a tire tread pattern.

7. A tire sensing system according to claim 3, wherein said memory includes instructions to identify a circumferential sequence of a plurality of reflectively-differential structures applied to and/or embedded within the associated tire.

8. A non-transitory machine-readable storage medium having stored thereon machine-readable instructions to cause a processor to:
transmit a millimeter wave toward an associated tire using a millimeter wave transmitting device;
receive a millimeter wave reflected from the associated tire at a millimeter wave receiving device;
image first and second radial extents of the associated tire based on said received millimeter wave;
determine a dimensional difference between said first and second radial extents of the associated tire;
determine a presence along said first radial extent and/or said second radial extent of the associated tire of an associated foreign substance having at least a predetermined minimum dimension; and,
classify the associated foreign substance as belonging to one or more predetermined classes of foreign substances.

9. A non-transitory machine-readable storage medium according to claim 8, wherein said instructions to image said first and second radial extents include an inverse synthetic aperture radar algorithm.

10. A non-transitory machine-readable storage medium according to claim 8, wherein the first radial extent corresponds to an outer surface of the associated tire, the second radial extent corresponds to a groove of the associated tire that at least partially defines an associated tire tread, and said instruction to determine said dimensional difference includes an instruction to determine a radial difference corresponding to a depth of the associated tire tread.

11. A non-transitory machine-readable storage medium according to claim 8, wherein said instructions to determine said presence of the associated foreign substance includes instructions to determine an approximate radial dimension and an approximate angular position of the associated foreign substance on the associated tire in relation to a cylindrical coordinate system with an origin at the center of the associated tire.

12. A non-transitory machine-readable storage medium according to claim 8, wherein said instructions to image said first and second radial extents of the associated tire includes instructions to measure a skew along a z-axis of the associated tire in relation to a cylindrical coordinate system with an origin at the center of the associated tire, and instructions to estimate a corresponding z-offset as a function of time.

13. A non-transitory machine-readable storage medium according to claim 8, wherein said non-transitory machine-readable storage medium includes instructions to compare said imaged first and second radial extents of the associated tire with stored image data of a tire tread pattern.

14. A non-transitory machine-readable storage medium according to claim 8, wherein said non-transitory machine-readable storage medium includes instructions to identify a circumferential sequence of a plurality of reflectively-differential structures applied to and/or embedded within the associated tire.

15. A method of sensing a physical characteristic of an associated tire, said method comprising:
transmitting a millimeter wave toward the associated tire;
receiving a millimeter wave reflected from the associated tire;
imaging first and second radial extents of the associated tire using said received millimeter wave;
determining a dimensional difference between said first and second radial extents of the associated tire;
determining a presence along said first radial extent and/or said second radial extent of the associated tire of an associated foreign substance having at least a predetermined minimum dimension; and,
classifying the associated foreign substance as belonging to one or more predetermined classes of foreign substances.

16. A method according to claim 15, wherein said first radial extent corresponds to an outer surface of the associated tire, said second radial extent corresponds to a groove of the associated tire that at least partially defines an associated tire tread, and said action of determining said dimensional difference includes determining a radial difference corresponding to a depth of the associated tire tread.

17. A method according to claim 15, wherein said action of determining said presence of the associated foreign substance includes determining an approximate radial dimension and an approximate angular position of the associated foreign substance on the associated tire in relation to a cylindrical coordinate system with an origin at the center of the associated tire.

18. A method according to claim 15, wherein said action of imaging said first and second radial extents of the associated tire includes measuring a skew along a z-axis of the associated tire in relation to a cylindrical coordinate system with an origin at the center of the associated tire, and estimating a corresponding z-offset as a function of time.

19. A method according to claim 15 further comprising comparing said imaged first and second radial extents of the associated tire with stored image data of a tire tread pattern.

20. A method according to claim 15 further comprising identifying a circumferential sequence of a plurality of reflectively-differential structures applied to and/or embedded within the associated tire.

\* \* \* \* \*